United States Patent [19]

Bolton et al.

[11] 4,133,294

[45] Jan. 9, 1979

[54] PROCESS FOR MARKING MOLLUSCS

[75] Inventors: Ellis T. Bolton; Noel D. Dey, both of Lewes, Del.

[73] Assignee: University of Delaware, Newark, Del.

[21] Appl. No.: 791,547

[22] Filed: Apr. 27, 1977

[51] Int. Cl.² ............................................ A01K 61/00
[52] U.S. Cl. ...................................................... 119/4
[58] Field of Search .................... 119/1, 2, 3, 4, 51 R; 424/227

[56] References Cited

U.S. PATENT DOCUMENTS

| | | | |
|---|---|---|---|
| 2,849,981 | 9/1958 | Rose et al. | 119/1 |
| 3,103,202 | 9/1963 | Loosanoff et al. | 119/4 |
| 4,053,593 | 10/1977 | Frumoff | 424/227 |

Primary Examiner—Russell R. Kinsey
Assistant Examiner—Robert P. Swiatek

[57] ABSTRACT

A new method to mark large numbers of molluscs permanently is described. Molluscs, in particular certain bivalve molluscs, (>1mm) are placed in a tank containing media, food, and tetracycline at a concentration of 0.5–200mg $l^{-1}$. Bivalves so treated daily for one to fourteen days, or longer as desired, will be permanently marked in such a manner as to render them identifiable at any later time. The mark is normally weakly visible but fluoresces a vivid yellow-orange when exposed to ultraviolet light.

5 Claims, No Drawings

PROCESS FOR MARKING MOLLUSCS

The Government of the United States has rights in this invention pursuant to Grant No. 04-6-158-44120 awarded by the Department of Commerce.

This invention relates to the marking of molluscs so that they can be identified at any later time.

Shellfish poaching is a problem which may cause monetary loss or other untoward results. This is a recognized problem, at present, in the Chincoteague Bay which might be ameliorated by marking which is protected or sanctioned by authority. There is no doubt that "poaching," or other forms of encroachment upon a person's mollusc property is a global phemonenon.

The commercial surf-clam harvest represents a very large industry. (100,000 metric tons of meat in 1970 falling to about 20,000 tons in 1975). Some evidence points to a serious depletion in natural supplies. Yet nothing is known of the feasibility of replenishing natural wild populations by addition of cultured molluscs. An identification mark would be a boon to such a venture — indeed, might be the crucial element in success or failure of such a venture attempted by private industry or industry consortium. In this general area, distinguishing marks to establish ownership, licensing, etc., could be a paramount benefit.

The common hard clam, as certain other molluscs, are motile and may move hundreds of feet in an annual cycle. To track and distinguish such forms would be significant especially at the periphery of leased areas.

Past methods of marking molluscs involved the individual gluing of tags to the shell (Sisson and Butzieger, 1970. Application of tags to Conchs with epoxy resin cement. Progressive Fish-Cult.; 32:63–64), or grinding grooves in the shell (Ropes and Merrill, 1970. Marking Surf Clams. Proc. Natl. Shellfish. Assoc.; 60:99–106), or similar adornments which are not suited to marking large numbers of molluscs without great labor.

Nakahara (1961. Determination of the growth rates of the nacreous layer by the administration of tetracycline. Bull. Natl. Pearl Res. Lab.; 6:607.) reported the uptake of tetracycline by the nacre and pearls of the bivalve mollusc Pinctada after the injection of 3mg of the drug into the adductor muscle of adult individuals. His aim in this work was the study of the growth rate of the nacre as related to the growth rate of the pearl. Using a similar method, Wada (1964. Studies on the mineralization of the calcified tissue in Molluscs. II. Experiments by the administration of tetracycline on the mineralization of the shell. Bull. Jap. Soc. Sci. Fish. 30(4)326–330.) studied the initiation of shell crystal growth by placing a glass cover-slip between the mantle and the shell prior to injection of the drug.

The use of alizarin sodium monosulfonate to mark bivalve shells was developed by Hidu and Hanks (Hidu, H. and J. E. Hanks. 1968. Vital Staining of Bivalve Mollusk Shells with Alizarin Sodium Monosulfonate. Proc. Natl. Shellfish. Assoc.; 58:37–41). After the alizarin sodium monosulfonate was dissolved in sea water, the bivalve mollusc incorporated the compound into the new shell and into the entire periostracum, which is the outer organic covering on the shell. The color of alizarin sodium monosulfonate is reddish-purple, which under some conditions, especially for lightly stained specimens makes it possible to confuse the mark with common purple patching or marking which occurs naturally in the hard clam *Mercenaria mercenaria*, as well as many other molluscs.

These methods are either not feasible for marking large numbers of molluscs simultaneously, or the artificial markings can be confused with natural markings, or the marked mollusc may not be acceptable to the market place.

It is the object of the invention to overcome the objections to the prior art processes and provide a simple method for marking commercially valuable molluscs.

These objects are accomplished by feeding edible molluscs during the growing stage in a medium containing tetracycline. It is preferred that the concentration of tetracycline be kept at a concentration of 0.5–200mg $1^{-1}$. The feeding with tetracycline can be continued for one to fourteen days or longer and repeated to give several markings. The bivalve molluscs should be at least 1 mm in size. Treated in this manner, the inlaid mark is permanent and only weakly visible, but fluoresces a vivid yellow-orange when exposed to ultraviolet light.

The following gives the specifications of the physical parameters necessary to induce the incorporation of tetracycline into bivalve shells and the procedures that may be used:

| | Specifications |
|---|---|
| Media | Natural or artificial sea water or appropriate solutions of salts |
| Tetracycline | Any commonly commercially available tetracycline, 0.5–200mg $1^{-1}$ |
| Temperature | 8–35° C |
| D.O. | >3ppm |
| Salinity | 10–35°/oo |
| Algal food | Any algal species combination which promotes rapid growth, or in combination with prepared diet supplements |
| Quantity of algae | As required; approximately $10^8$ cells/gram mollusc weight/day |
| Feeding density | 0.2–1 × $10^6$ cells/ml at least once per day |
| Circulation | Sufficient to keep algae in suspension and maintain D.O. |
| Tank volume | As required |
| Lighting | Subdued visible light is preferred; strong light shortens life of media |
| Ultraviolet light | Any of several on the market, but must have an emission range which includes 254nm |
| Number of molluscs | One to several million, as desired |

Procedures

1. Young bivalves, >1mm, obtained by known methods are placed in a tank.
2. Media are added, with algae blended in, to desired volume.
3. The desired quantity of tetracycline is then added to the tank, or alternatively included among the media, and allowed to dissolve, bringing the concentration of tetracycline in the media to at least 0.5mg $1^{-1}$. Levels higher than 50mg $1^{-1}$ do not ordinarily increase marking effectiveness.
4. After approximately 24 hours, or 48 hours if the tank is kept in very subdued light and algae still remain, the water is drained from the tank and discarded.
5. The mark can be made visible by shining an ultraviolet light on the shell. The ultraviolet light produces a vivid yellow fluorescence from the band around the outer edge of the shell which has incorporated the tetracycline.

Procedures 2–4 are repeated until desired mark size and intensity have been obtained. This period would be expected to be 1–14 days for young organisms and longer, as desired, for older organisms.

As the mark appears as a line in the shell varying in width dependent upon the number of days of feeding, multiple lines can be made by alternate feedings with and without tetracycline. Hence, a banded appearance results which has the property of serving as a distinctive marking system.

The marking process is an advancement over previous methods of marking molluscs for identification. The incorporation of tetracycline into mollusc shells including its inherent distinctive fluorescence under ultraviolet light, which is not quenched by its inclusion in shell, is a new and unexpected useful application for the drug. The tetracycline, which is water soluble, is rendered permanently insoluble once incorporated into the mollusc shell. The inlaid mark does not affect the health of the mollusc, and does not affect the taste, appearance, or acceptability of the mollusc flesh for human consumption.

Tetracycline marks could be used by a hatchery to identify the juvenile molluscs which are produced. These molluscs, when placed on a company's growing land, could later be identified as being from a certain hatchery. Thus, the hatchery's claims as to the quality of its product could be substantiated. Marks would also be placed on molluscs by a hatchery when the hatchery is attempting to expand its markets and demonstrate the suitability of its product in new areas.

Tetracycline marks would be used either by companies which grow molluscs in the wild or facilities which grow their molluscs in tanks. In every case the company would be asserting that its product has certain qualities, such as was grown in pollution-free waters or is disease free.

Industry contracts with suppliers and growers for molluscs. It is not known whether the practice of "bait and switch" is presently a problem. However, as processors become less intimately acquainted with suppliers, the opportunity for breach of faith becomes greater. It seems that a processor would be well-advised to protect himself against possible abuse of this sort — e.g., mixing in contaminated oysters with acceptable stocks.

It is apparent that changes and modifications may be made without departing from the invention in its broader aspects. The aim of the appended claims, therefore, is to cover all such changes and modifications as fall within the true spirit and scope of the invention.

We claim:

1. A process for marking permanently the shells of edible molluscs which marking will fluoresce when exposed to ultra-violet light, which process comprises feeding said molluscs with food medium containing tetracycline during the growing stage of the molluscs.

2. The process of claim 1 wherein the feeding is carried out for a period of one to fourteen days.

3. The process of claim 1 wherein the tetracycline is present in a concentration of at least 0.5mg $l^{-1}$.

4. The process of claim 1 wherein there are alternate periods of growth by feeding in the absence of tetracycline to produce a banded appearance.

5. The process of claim 1 wherein the edible molluscs are bivalve molluscs.

* * * * *